March 12, 1963 — W. L. HOLLANDER — 3,080,749
METHOD OF SUBSOIL SURVEYING AND PROBE THEREFOR
Filed Jan. 4, 1960 — 2 Sheets-Sheet 1

William L. Hollander,
Inventor.
Koenig and Pope,
Attorneys.

March 12, 1963  W. L. HOLLANDER  3,080,749
METHOD OF SUBSOIL SURVEYING AND PROBE THEREFOR
Filed Jan. 4, 1960  2 Sheets-Sheet 2
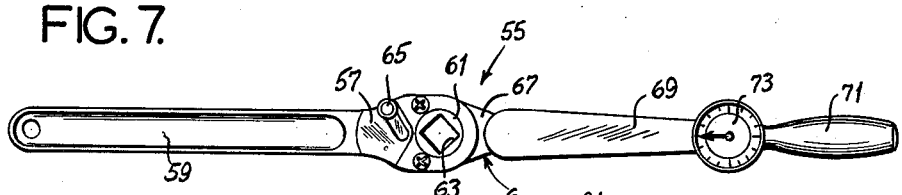
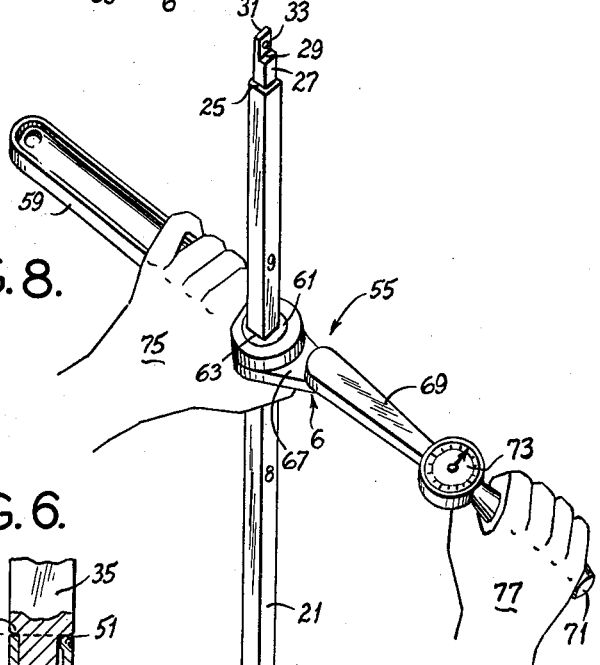
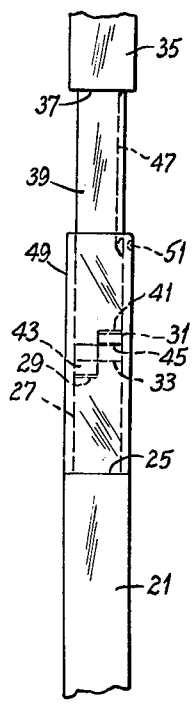
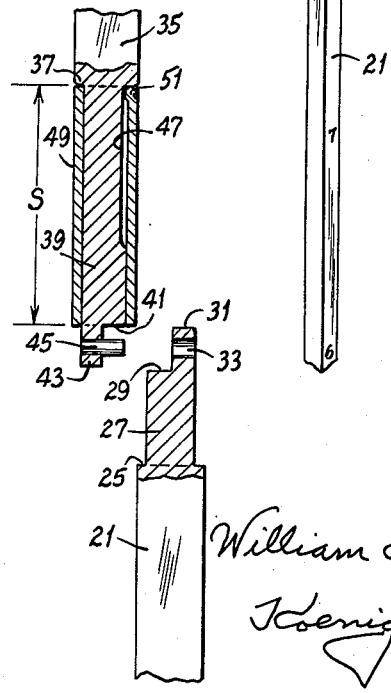

United States Patent Office 3,080,749
Patented Mar. 12, 1963

3,080,749
METHOD OF SUBSOIL SURVEYING AND
PROBE THEREFOR
William L. Hollander, Centralia, Mo., assignor to A. B. Chance Company, Centralia, Mo., a corporation of Missouri
Filed Jan. 4, 1960, Ser. No. 320
6 Claims. (Cl. 73—101)

This invention relates to a method of earth subsoil surveying and to a probe therefor, and with regard to certain more specific features, to an earth probe useful, according to the method, in determining subsoil load-bearing properties or the like.

Among the several objects of the invention may be noted the provision of a convenient method for determining subsoil conditions relating to load-bearing ability and the like, without requiring excavation for samples; the provision of light-weight portable apparatus adapted to be carried and operated by one man in relatively inaccessible territory, to obtain information as to said conditions at various depths below the surface; the provision of a method and apparatus of the class described which require only simple torque measurements for obtaining the desired information; and the provision of apparatus of the class described requiring a minimum expenditure of money, time and physical effort in order to make useful surveys. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which one of various possible embodiments of the invention is illustrated.

FIG. 5 is a side elevation, illustrating certain coupling details;

FIG.6 is a view similar to FIG. 5, except that portions are shown in cross section with the coupling parts separated;

FIG. 7 is plan view of a driving wrench assembly; and,

FIG. 8 is an isiometric view, illustrating a torque-measuring step in the new process.

Corresponding reference characters indicate corresponding parts throughout the several views of the drawings.

Heretofore, preliminary and other surveys for determining earth-bearing characteristics and the like for foundation and anchor placements have required much time and costly equipment and labor to excavate and sample, particularly in areas not accessible to roads for transportation of the equipment required. By means of the present invention these disadvantages are overcome, and an adequate survey may rapidly be made by, for example, one man exploring even inaccessible territory. It is particularly, through not exclusively useful for right of-way surveys for pipe and pole lines along which suitable locations must be found for anchors, foundations, and the like.

Figure 1:
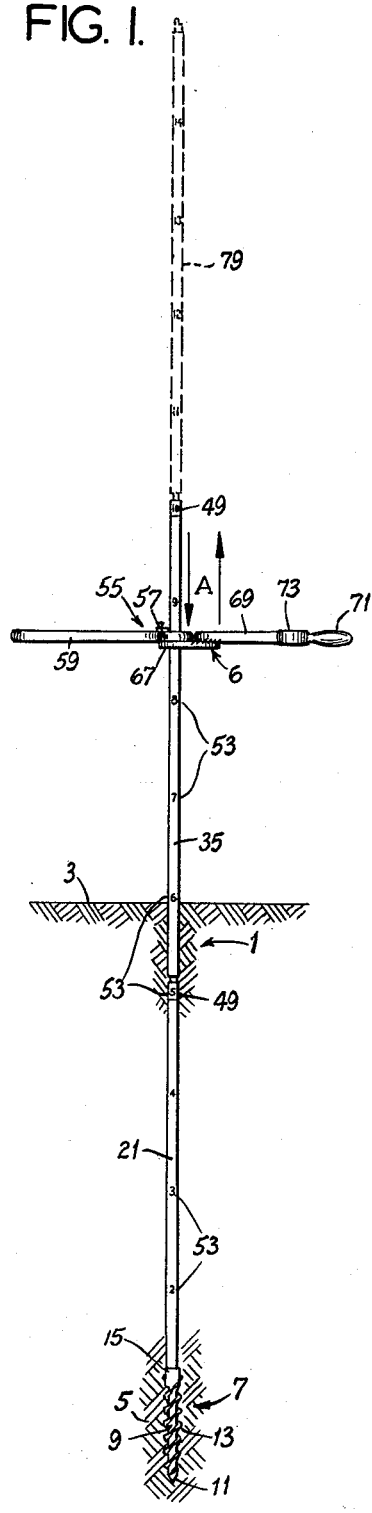
FIG. 1 is a side elevation of parts, partly in section and partly in dotted lines, illustrating operation of my invention.
Figure 2:
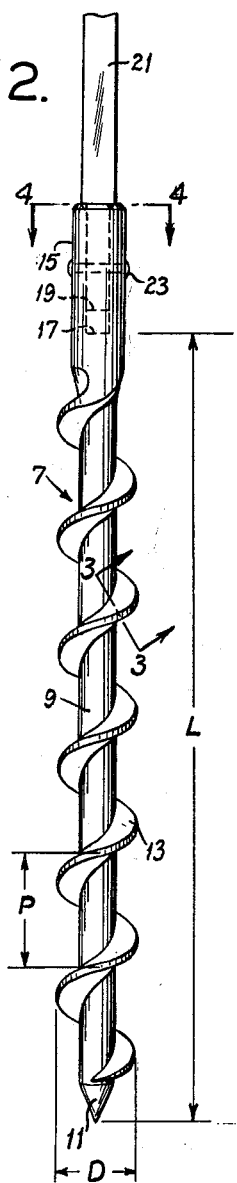
FIG. 2 is a side elevation of a probe head including part of one drive shaft therefor.
Figure 3:
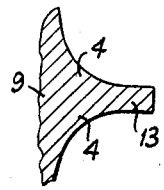
FIG. 3 is an enlarged oblique fragmentary section, taken on line 3—3 of FIG. 2.
Figure 4:
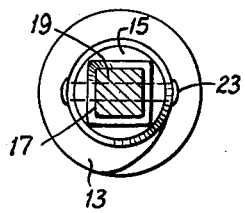
FIG. 4 is an enlarged cross section, taken on line 4—4 of FIG. 2.

Referring now more particularly to FIG. 1, numeral 1 indicates typical soil, the ground level being indicated at 3 and the subsoil at 5. At numeral 7 (FIG. 2) is shown a one-piece, preferably, though not necessarily, cast probe head, consisting of a central shank 9, pointed at 11 and carrying a spiral right-handed screw flange 13 terminating in a head 15 in which is a square socket 17. As shown in detail in FIG. 3, the screw flange 13 is filleted into the shank 9 (see numerals 4). It may consist of several flange loops, that is, on the order of six or so in a shank length L of about one foot, with an outside screw flange diameter D of 1¼ inch or so. This arrangement provides a pitch distance P which is slightly greater than the outside diameter of the screw flange 14. For example, P may be 1¾ inches. Thus the outside diameter of the screw flange in inches may be a small fraction of the number of turns of the screw. This fraction in the example given is 5/22 or approximately ¼. These figures, which are given by way of example, are not to be taken as limiting, but to indicate the general direction which the design of the probe head may take for satisfactory practical results. The socket 17 is adapted for the reception of a reduced square end extension 19 of a square shaft 21. The end 19 is held in the socket 17 by means of a bolt or rivet such as 23.

As illustrated in FIGS. 5 and 6, the other end of the square shaft 21 is inwardly shouldered, as shown at 25, to form an extension 27 of square cross section except that it is notched as shown at 29 to provide a lug 31 in which is a hole 33. This is for the attachment of additional square shafts, one of which is shown for example at numeral 35. One end of each such additional shafts is shouldered, as shown at 37, to provide a shank 39 of the same square cross section as the shank 27, except that shank 39 is provided with a notch 41 to form a lug 43, rigidly supporting a pin 45 adapted to be inserted into the opening 33. When so inserted, the lugs 31 and 43 are conjugate to form a continuous reduced square coupling section between shafts. At the other end of each additional shaft is a form like that shown on the upper end of shaft 21. Thus the cross sections of all pairs of joined extensions 27 and 39 are of reduced square shape.

To maintain fastened conditions, each extension 39 is provided with a closed-end groove 47 and a surrounding slidable square sleeve 49, a portion of which is indented into the groove 47, as shown at 51. This arrangement allows sliding of the sleeve on shank 39 while holding it captive thereto so as to prevent loss. The length S of the sleeve 49 equals that of the shank 39 from its shoulder 37 to the bottom of its notch 41, as indicated in FIG. 6. Its thickness is such as to produce an outside square shape the same as that of shafts such as 21 and 35. Thus when a sleeve 49 is retracted as shown in FIG. 6, the pin 45 may be inserted into the opening 33 while adjoining the lugs 31 and 43, after which, as shown in FIG. 5, the sleeve 49 may slide down to surround and form a lock for the engaged portions. Since the parts shown in FIGS. 5 and 6 are to be operated in the vertical position therein shown (as appears below and in FIG. 1), each sleeve 49 during operation tends to assume and maintain its locking position by gravity. To effect disengagement, the sleeve needs simply to be slipped up and shaft 35 moved sidewise relative to shaft 21.

A plurality of shaft 35 are provided to form a set to be carried to the survey location. The number depends upon the maximum depth of survey expected to be reached. Thus a number of these shafts may be coupled together to form a rigid string of them, as required. A mated set of such shafts carries appropriate depth calibrations such as shown at 53, for example, at one-foot intervals, it being understood that, if need be, some of the calibration numbers may be carried upon the sleeves 49, as shown in FIG. 1.

Referring to FIG. 7, there is shown at numeral 55 a double-armed wrench assembly, the first rigid arm of which is constituted by a ratchet wrench 57 having a rigid arm 59 and a reversible-ratchet-driven centerpiece 61, in which is a square hole 63 adapted slidingly to receive any of the shafts such as 21, 35, etc., or sleeves 49. Rapid reversal of ratcheting is obtained through a conventional ratchet reversing mechanism under control of a reversing lever 65.

At numeral 67 is shown an adapter rigidly attached to the ratchet wrench 57 for rigidly mounting a torque wrench 69 forming the second arm of the assembly. The torque wrench 69 is of conventional type, having a handle 71 and a suitable gauge 73 calibrated to indicate torque units such as, for example, lbs.-ft. or lbs.-inches. Or calibration may be made to read in terms of earth-bearing pressures such as tons per square foot or the like, as obtained from previously determined correlations of torque and bearing pressures. The rigid connection at 6 between the torque wrench 69 and adapter 67 may either be permanent, as by riveting or welding, or quick-detachable in any appropriate manner known to those skilled in the art. The illustrated nondetachable form is preferred, because, it prevents accidental separation of the ratchet and torque wrenches which form the wrench assembly.

Operation is as follows (referring to FIGS. 1 and 8):

The wrench assembly 55 is applied to shaft 21 by means of its square hole 63. By applying torque with two hands through both arms 59 and 69 of the combined wrench 55, the probe 7 may conveniently be screwed into the earth 1 and down into its subsoil regions 5. Torque is applied by repeated clockwise forward and return ratcheting action in a convenient plane between the operator's hips and shoulder, the drive shaft slipping down through the wrench assembly as the work progresses (indicated on the drawings by the opposing arrows A in FIG. 1). When the probe 7 reaches a desired depth, as determined from the calibration marks 53, a torque reading is obtained as illustrated in FIG. 8, wherein one hand 75 of the operator is transferred from wrench arm 59 and applied centrally to grip around the central part of the wrench assembly 55 and the adjacent part of the square shaft therein, so as to provide a central reaction point while the other hand 77 is used to pull the torque wrench handle 71. Thereby a torque reading is obtained on the gauge 73 as the head 7 advances. It will be understood that although a torque wrench 69 is shown which is of the dial type, other types of torque wrenches may be employed, such as the so-called converging-line type known in the art.

The torque registered on the torque gauge 73 represents the effort required to force the probe head through the earth at the desired depth and will be greater or less as the earth becomes harder or softer. The torque information gathered is correlative with earth hardness and the latter is correlative with the soil's ability to withstand predetermined foundation, anchor and like loads. After a torque measurement has been completed, the probe may be removed by changing the position of ratchet lever 65, so as to reverse the ratcheting operation for withdrawal of the apparatus from the earth.

From the above it will be apparent that the available manually applied moment is greater while the apparatus, with two hands on the wrench arms, is being screwed down to reach a predetermined depth than when the torque reading is taken with one hand 75 providing a central reaction to the other on handle 71. Thus the manual driving effort during the advance for rapid positioning of the head 7 before a torque reading is taken may be accomplished rapidly and with minimum effort.

For substantial depths, a single shaft such as 21 may not be sufficient to carry the probe 7 downward the distance desired. Additional shafts such as 35 and one or more such as shown in dotted lines at 79 in FIG. 1 may be used in the manner described above, their attachments being effected as illustrated in FIGS. 5 and 6. As is clear from the latter figures, detachments are readily effected by sliding up the sleeves between shafts and withdrawing the pins 45 from the holes 33.

Although the shafts such as 21, 35 and 79 are shown as being of square cross section, it will be understood that any nonround sections may be employed, such as hexagonal sectons, splined sections, et cetera. It will be understood that the hole 63 in wrench 57 will have a conjugate shape for any section selected.

It will be apparent that the advantage of the employment of a ratchet mechanism in connection with the torque wrench results in the ability of an operator to advance or withdraw the screw probe without removing his hands from the wrench arms 59 and 71. While ratcheting, the operator can conveniently watch the depth indexes 53. To take a torque reading requires only shifting hand 75 to the center, as shown in FIG. 8, and a sufficient pull by hand 77 at 71 to advance the screw 7 further as a torque reading is noted. It will be seen that the invention is of a form requiring no extraneous tools for bringing its various parts into assembled position for operation, nor for disassembling them.

An advantage of having the torque-measuring means in one handle only of the wrench assembly 55 is that it becomes direct-reading and less subject to error. If a torque-measuring device were in each handle and readings taken while applying torque to both with two hands, then an additional computation would be required to obtain total torque, which would of course be a likely source of error in difficult terrain.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A method of surveying soil at selected depths comprising: forcing an elongated screw probe into the ground along a generally helical path of travel by rotating the probe; discontinuing rotation of the probe when the latter reaches a selecting depth; applying a test moment to the probe about the axis thereof in a direction to commence rotation and downward movement of the probe into the soil; and measuring the torque required to effect commencement of rotation and downward movement of the probe at the selected depth, whereby the plasticity of the soil at various selected depths may be determined.

2. Apparatus for surveying subsoil comprising: a screw-shaped test probe; a shaft connected to said probe; and a pair of lever arms slidably engaged with said shaft for rotating the latter to drive the probe into the soil, said lever arms including torque measuring means thereon for indicating the torque required to drive the probe into the soil.

3. Apparatus for surveying subsoil comprising: a screw-shaped test probe; a shaft connected to said probe; and two rigidly interconnected lever arms slidably engaged with said shaft for rotating the latter to drive the probe into the soil, one of said lever arms including torque measuring means thereon for indicating the torque required to drive the probe into the soil.

4. Apparatus as set forth in claim 3, wherein is included ratchet means operably coupled with said lever arms for allowing driving engagement of said lever arms with said shaft only when the shaft is driven in one preselected direction.

5. An earth probe for subsoil surveying comprising: a probe head in the form of a screw; a drive shaft connected to said screw; and a ratchet type torque wrench having two opposite lever components and an opening adapted for slidable driving application to said shaft, one of said lever components including torque measuring means adapted to measure and indicate the torque required for screwing said probe head into the earth.

6. An earth probe for subsoil surveying comprising: a sectional shaft having quick-detachable connections between said sections, the cross sections of substantially all of said sections and connections being of noncircular form, said sections having progressive index means to indicate the depth of the probe below the surface of the soil; a ratchet type torque measuring wrench having two opposite handles with the torque measuring components of said wrench being included in one of said handles, said wrench having a conjugate, noncircular opening adapted to receive said shaft; and a screwhead at one end of the shaft, the remainder of the shaft being adapted for slidable reception of said torque measuring wrench, whereby the screwhead may, from a given point, be advanced to any of various soil depths by rotating said shaft and torque measured according to such depth.

References Cited in the file of this patent

UNITED STATES PATENTS

| | | |
|---|---|---|
| 345,698 | Jones | July 20, 1886 |
| 925,293 | Cheney | June 15, 1909 |
| 1,180,982 | Czesnak | Apr. 25, 1916 |
| 1,775,076 | Watson et al. | Sept. 2, 1930 |
| 1,849,268 | Birkenmaier | Mar. 15, 1932 |
| 2,404,029 | Birk | July 16, 1946 |
| 2,603,319 | Dyche | July 15, 1952 |
| 2,603,967 | Carlson | July 22, 1952 |
| 2,993,367 | Fletcher et al. | July 25, 1961 |

FOREIGN PATENTS

| | | |
|---|---|---|
| 771,540 | Great Britain | Apr. 3, 1957 |